United States Patent
Johnston et al.

(10) Patent No.: US 11,572,736 B2
(45) Date of Patent: Feb. 7, 2023

(54) RECYCLABLE PLASTIC MAN-DOOR

(71) Applicant: DuraServ Corp., Carrollton, TX (US)

(72) Inventors: Eddie Johnston, Dalton, OH (US); Phillip Dailey, Prosper, TX (US)

(73) Assignee: DURASERV CORP., Carrollton, TX (US)

( * ) Notice: Subject to any disclaimer, the term of this patent is extended or adjusted under 35 U.S.C. 154(b) by 0 days.

(21) Appl. No.: 17/062,838

(22) Filed: Oct. 5, 2020

(65) Prior Publication Data

US 2022/0106830 A1 Apr. 7, 2022

(51) Int. Cl.
*E06B 3/86* (2006.01)
*B29C 48/07* (2019.01)
*B29C 65/56* (2006.01)
*B29C 48/00* (2019.01)
*B29C 65/00* (2006.01)
*B29L 31/00* (2006.01)
*B29K 509/00* (2006.01)

(52) U.S. Cl.
CPC ............ *E06B 3/86* (2013.01); *B29C 48/0021* (2019.02); *B29C 48/0022* (2019.02); *B29C 48/022* (2019.02); *B29C 48/07* (2019.02); *B29C 65/562* (2013.01); *B29C 66/41* (2013.01); *B29K 2023/06* (2013.01); *B29K 2509/00* (2013.01); *B29L 2031/724* (2013.01)

(58) Field of Classification Search
CPC . B29C 48/0021; B29C 48/07; B29C 48/0022; B29C 66/41; B29C 65/562; B29L 2031/724
USPC ................ 425/290, 291, 300, 303
See application file for complete search history.

(56) References Cited

U.S. PATENT DOCUMENTS

| | | | | |
|---|---|---|---|---|
| 3,996,090 A * | 12/1976 | Leatherman | ........ | B29C 66/1224 264/211 |
| 4,544,440 A * | 10/1985 | Wheeler | ................ | B32B 38/06 156/581 |
| 4,918,814 A * | 4/1990 | Redmond | .......... | H01R 13/2414 29/877 |
| 5,476,626 A * | 12/1995 | Miyama | .................... | B60J 10/15 264/129 |
| 6,092,343 A * | 7/2000 | West | ........................ | E06B 3/78 52/311.1 |
| 6,253,527 B1 * | 7/2001 | De Zen | ................. | B09B 3/0033 52/745.05 |
| 6,696,011 B2 * | 2/2004 | Yun | ..................... | B29C 49/4205 264/564 |
| 6,824,851 B1 * | 11/2004 | Locher | .................. | B29C 70/086 428/72 |
| 6,866,740 B2 * | 3/2005 | Vaders | ...................... | B27N 3/18 156/581 |
| 7,178,308 B2 * | 2/2007 | Fagan | .................... | B29C 48/001 52/800.1 |
| 7,399,438 B2 * | 7/2008 | Clark | ........................ | B27N 3/20 264/109 |
| 7,501,037 B2 * | 3/2009 | Stroup | .................... | E06B 3/822 156/267 |

(Continued)

*Primary Examiner* — Seyed Masoud Malekzadeh
(74) *Attorney, Agent, or Firm* — Morgan, Lewis & Bockius LLP

(57) ABSTRACT

A recyclable polyethylene man-door comprises an interior panel and an exterior door panel, each panel having a horizontal pattern of cut-outs and optionally comprising a blend of mineral additives that do not adversely affect the recyclability of the finished product.

7 Claims, 5 Drawing Sheets

(56) References Cited

U.S. PATENT DOCUMENTS

| | | | | |
|---|---|---|---|---|
| 7,721,500 | B2* | 5/2010 | Clark | B32B 3/30 |
| | | | | 52/794.1 |
| 7,943,070 | B1* | 5/2011 | Clark | B27N 3/00 |
| | | | | 264/300 |
| 8,518,529 | B2* | 8/2013 | Kondo | B29C 48/832 |
| | | | | 428/304.4 |
| 9,920,569 | B2* | 3/2018 | Wang | B29C 48/11 |
| 2001/0048177 | A1* | 12/2001 | Close | B29C 48/9135 |
| | | | | 264/912 |
| 2003/0003252 | A1* | 1/2003 | Yun | E04C 2/34 |
| | | | | 428/188 |
| 2003/0165660 | A1* | 9/2003 | Schwarzwalder | B29C 43/021 |
| | | | | 264/297.8 |
| 2004/0000120 | A1* | 1/2004 | Fagan | B29C 48/001 |
| | | | | 156/219 |
| 2004/0000746 | A1* | 1/2004 | Montagna | B29C 66/45 |
| | | | | 264/148 |
| 2004/0175537 | A1* | 9/2004 | Schwarzwalder | B29C 43/021 |
| | | | | 428/182 |
| 2008/0010924 | A1* | 1/2008 | Pietruczynik | B29C 48/001 |
| | | | | 52/309.1 |
| 2008/0213562 | A1* | 9/2008 | Przybylinski | B29B 7/92 |
| | | | | 156/701 |
| 2010/0021715 | A1* | 1/2010 | Kondo | B29C 44/3419 |
| | | | | 428/310.5 |
| 2015/0061172 | A1* | 3/2015 | Ackermann | B29C 44/468 |
| | | | | 264/45.9 |
| 2016/0361879 | A1* | 12/2016 | Johnson | B29C 51/26 |
| 2017/0001358 | A1* | 1/2017 | Krohmer | B29C 43/06 |
| 2017/0368768 | A1* | 12/2017 | Johnson | B29C 70/526 |
| 2018/0319106 | A1* | 11/2018 | Johnson | B29C 51/20 |

* cited by examiner

RECYCLABLE PLASTIC MAN-DOOR

FIELD OF THE INVENTION

The invention relates to polyethylene plastic man-doors.

DESCRIPTION OF THE RELATED ART

A man-door is a standard swing door. A man-door may also be referred to as a pedestrian door, a pass door, an access door, or historically a wicket. These doors are just large enough that a single person may enter through the opening. Historically, these doors were used to control access. Rather than open larger gates or doors, the use of the man-door allowed entry of only one person at a time. The man-door provides a convenient way to enter a building or structure without having to open a larger gate or overhead door. Use of a man-door provides several benefits, including preserving privacy and conserving energy. A man-door also provides an emergency exit in case power to an automated door is not accessible.

Oftentimes man-doors serve as entry points to the industrial side of retail, which frequently involves heavy forklift and cart traffic. Such traffic may put a significant amount of wear and tear on the man-door. As a result, man-doors must be made of a material that is sufficiently strong and durable to withstand this wear and tear, but also functional so that employees are not inhibited from quickly coming and going through the door. A more durable man-door will also increase the service life of the product, which reduces the overall cost to the consumer.

Man-doors commonly use materials such as aluminum, steel, wood, and glass. Wood doors are typically used in low-density residential construction and are not typically used on the commercial level. Further, wood doors have high susceptibility to warping if it gets wet, which makes them disadvantageous in a commercial application. Aluminum frames with glass in-fills or steel-clad doors are generally used at the commercial level. However, both steel and aluminum have a high risk of developing rust over time, and are not thermally efficient in comparison to other materials.

In choosing a door material, several factors are considered, including thermal performance, moisture protection, durability, and sustainability. Plastics such as polyethylene became a popular material choice for doors in the 1930s. Plastics are easy to clean, easy to maintain, impact resistant, corrosion resistant, eco-friendly, and water-resistant. Polyethylene has a lower specific gravity than steel, resulting in a lighter product, which makes transportation and installation easier. Despite polyethylene's low specific gravity, polyethylene still has comparable strength and durability to steel. Further, as polyethylene processes developed, plastic became a more cost-effective option than steel, and polyethylene can be easily recycled. Although polyethylene is slightly weaker and less durable than steel, the additional benefits of polyethylene make it a competitive material choice. Further, polyethylene can be used as a resin that may be blended with additives. These additives can increase the strength and durability of polyethylene, and overcome some of polyethylene's shortcomings in comparison to steel.

Fiberglass is another recently popular material choice for man-doors. Fiberglass is more rigid and lighter than polyethylene. This increased rigidity however, makes fiberglass sheets more prone to cracking. Fiberglass sheets also frequently have seams, which can create a weak point in the sheet. Unlike fiberglass and steel, polyethylene sheets do not have seams or weld points. However, fiberglass has many advantages similar to polyethylene that are important in construction of materials like man-doors such as being easy to clean, easy to maintain, and water-resistant. As a result, fiberglass is a popular additive for thermoset resins resulting in fiberglass reinforced plastics or FRPs. FRPs consist of a plastic material reinforced with glass fibers, and are frequently referred to as fiberglass in the commercial setting. The addition of FRPs and fiberglass can increase plastic thermal flexibility, strength, durability, and temperature sensitivity. However, FRPs are extremely difficult to recycle due to their composition. Although fiberglass by itself can be recycled by grinding, it is generally difficult to break down the fibers, and the problem is exacerbated when plastic and fiberglass are mixed together. Thermoset resins make the process even more difficult because they do not melt at high temperatures. Although there are methods to recycle FRPs, none are particularly cost effective. Recycling polyethylene itself, is a much more cost effective process.

High-density polyethylene is commonly extruded as part of the manufacturing process. Extrusion involves melting plastic and forming it into a desired profile. When polyethylene is extruded into sheets, there are additional methods to strengthen the door besides creating a polyethylene resin with additives. The core of the man-door can be removed in order to strengthen the polyethylene sheet. This also decreases the overall weight of the high-density sheet. The decrease in weight reduces the stress on the door panel and associated hardware.

The idea of the man-door has been around for some time. However, a door that mitigates the disadvantages of cutting through a sheet of material has been a challenge. As discussed above, there are several options, but none fully mitigates the detriments. Polyethylene sheets provide a close solution to this challenge, but polyethylene lacks the durability and strength of steel without the addition of some other material. However, as discussed above, the addition of these materials can reduce the important benefits of polyethylene. A polyethylene design that is recyclable and lightweight, but still strong and durable is needed in the industry.

SUMMARY OF THE INVENTION

Embodiments of the invention described herein utilize an extrusion process wherein recycled plastic pellets are heated together with mineral and polymer additives. The addition of mineral additives, such as calcium carbonate, to high-density polyethylene will increase the mechanical properties, such as plastic thermal flexibility, strength, durability, and temperature sensitivity, of the product. Unlike fiberglass, the addition of polymer minerals and additives, such as calcium carbonate, does not negatively impact the recyclability of polyethylene. Fiberglass strands are extremely difficult to break down and must be recycled through grinding or incinerating. These methods are difficult and expensive, so there is little cost benefit in recycling the fiberglass. Further, fiberglass is often mixed with toxic chemicals. This increases the difficulty and cost of the process because the chemicals must be filtered out before the fiberglass can be recycled.

After the high-density polyethylene plastic composition is extruded into plastic sheets, a computer numerical control (or "CNC") machine with routing bits will plunge cut and follow a tool path of the high-density polyethylene plastic sheets independently. The cut-outs are made in a horizontal pattern and are not centralized to one location. The horizontal pattern simultaneously strengthens the core of the man-door, reduces the man-door's ability to flex, and reduces the weight of the man-door.

The plastic milled out of the man-door is then recaptured and sent back into the supply chain to create additional high-density polyethylene plastic sheets. This results in zero-waste manufacturing operation.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

Figure 1:
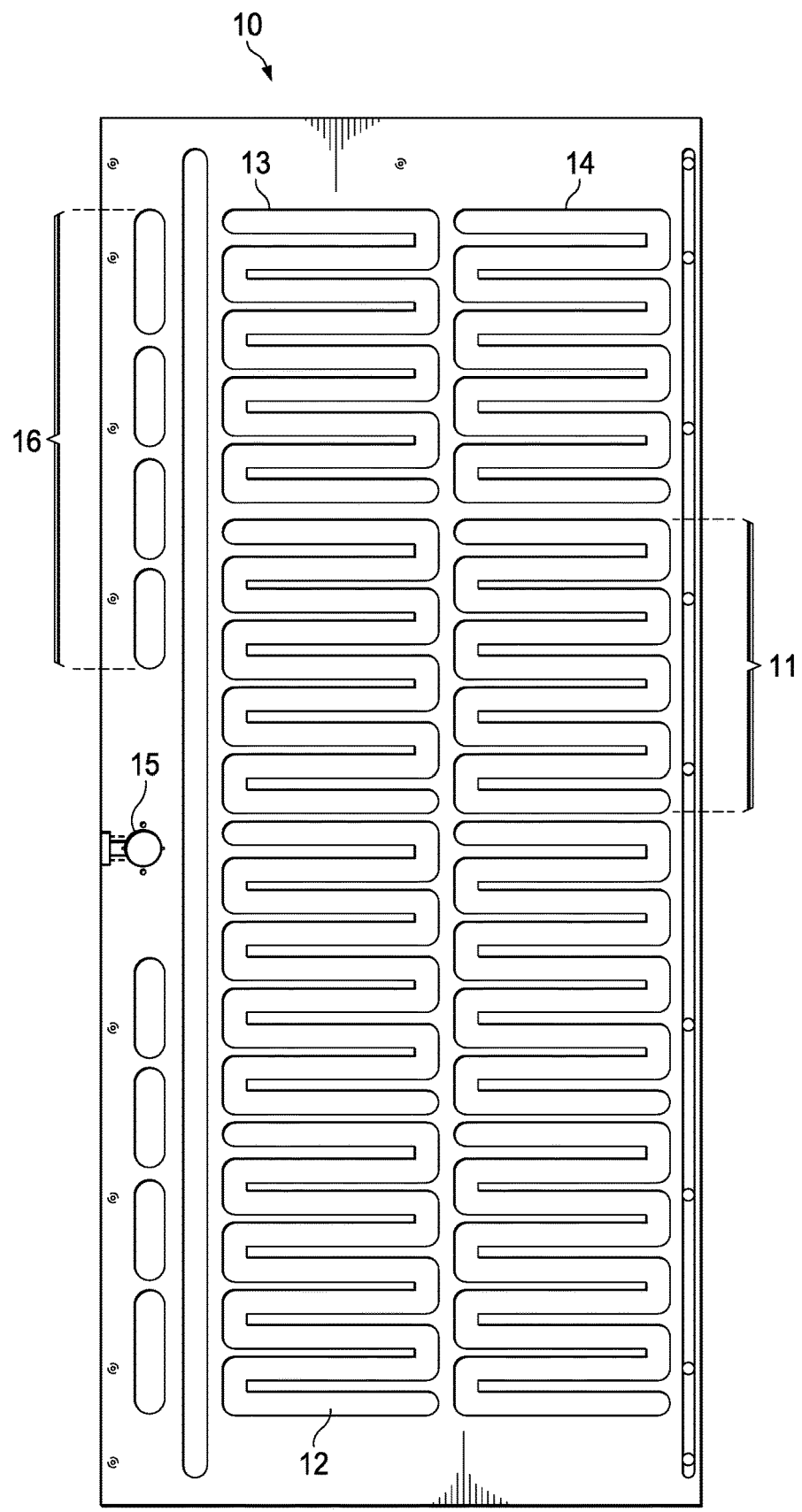
FIG. 1 is a front perspective of a new interior panel.

Exemplary embodiments are illustrated in the referenced figures. It is intended that the embodiments and figures disclosed herein are to be considered illustrative rather than restrictive. No limitation on the scope of the technology that follows is to be imputed to the examples shown in the drawings and discussed herein.

FIG. 1 shows a front perspective of a new interior panel 10 and an embodiment of a horizontal pattern 12. The new interior panel 10 is made up of high-density polyethylene and polymer blend additives. The polyethylene is worked through an extrusion process. In one embodiment, recycled polyethylene plastic pellets are used. In an embodiment, the plastic pellets are within a density range of 0.94 to 0.965 grams per cubic centimeter. The plastic pellets are placed in a funnel and fed into an extruder. The extruder heats the pellets together with a blend of polymer additives. In one embodiment, the polymer blend additive may be calcium carbonate. In certain embodiments, 15% of calcium carbonate is added to the recycled high-density polyethylene to increase stiffness and strength. The addition of a polymer blend additive, such as calcium carbonate will also improve (reduce) thermal expansion/contraction, while not adversely affecting the recyclability of the finished product. In some embodiments, the finished product will have a normal density of 0.99 grams per cubic centimeter.

After the plastic pellets and polymer additive(s) have been heated, a rotating screw forces the raw material blend into an oven. Once in the oven, various sizes of high-density polyethylene plastic sheets are configured through a friction melting process. This results in a high-density polyethylene plastic sheet with an increased thermal range. The reinforced plastic sheet is also more rigid and stable.

Referring to FIG. 1, a horizontal pattern 12 is shown on the front of the new interior panel 10. The horizontal pattern 12 is not centralized to one location. The horizontal pattern 12 is arranged by a series of horizontal cut-outs 11 made across the surface of interior panel 10. Horizontal cut-outs 11 are preferably formed by a CNC machine with a router bit that plunge cuts to a predetermined depth and then follows a tool path without retracting the router bit from the sheet. In certain embodiments, a 1⅜" diameter router bit is the primary tool used. In certain embodiments, the router bit routs the sheets to a depth of 0.68". The horizontal cut-outs 11 do not extend fully through the new interior panel 10 and it is important that the horizontal cut-outs leave a sufficient depth of material in the panel. During development, it was determined by the inventors that a remaining wall thickness of 0.19-0.23" provided the optimal balance between structural integrity and panel weight.

There are preferably two columns, 13 and 14, each with a plurality of horizontal cut-outs 11. In certain embodiments, the columns are spaced 0.96" apart. During development, it was determined by the inventors that this spacing achieved an optimal balance between the weight of the panel and the beam strength in the width direction.

The horizontal cut-outs 11 are preferably of equal diameter and spaced at equal distance from the neighboring cut-out. In certain embodiments, horizontal cut-outs 11 in the same column are spaced 1" apart. During development, it was determined by the inventors that this spacing achieved an optimal balance between the weight of the panel and the beam strength in the height direction.

The plastic removed from interior panel 10 when horizontal cut-outs 11 are formed is sent back into the supply chain, thus resulting in a zero-waste production.

The application of the horizontal pattern 12 reduces the plastic sheet's ability to flex. This results in a stronger plastic sheet. The horizontal pattern 12 also reduces the weight of the door. The overall reduction in weight reduces stress on the door panel and associated hardware. The horizontal pattern 12 also increases cycle time of the door.

In some embodiments, a doorknob hole 15 is cut out from the panel. In some embodiments, a plurality of lock holes 16 are cut out above and below the doorknob hole 15.

Figure 2:
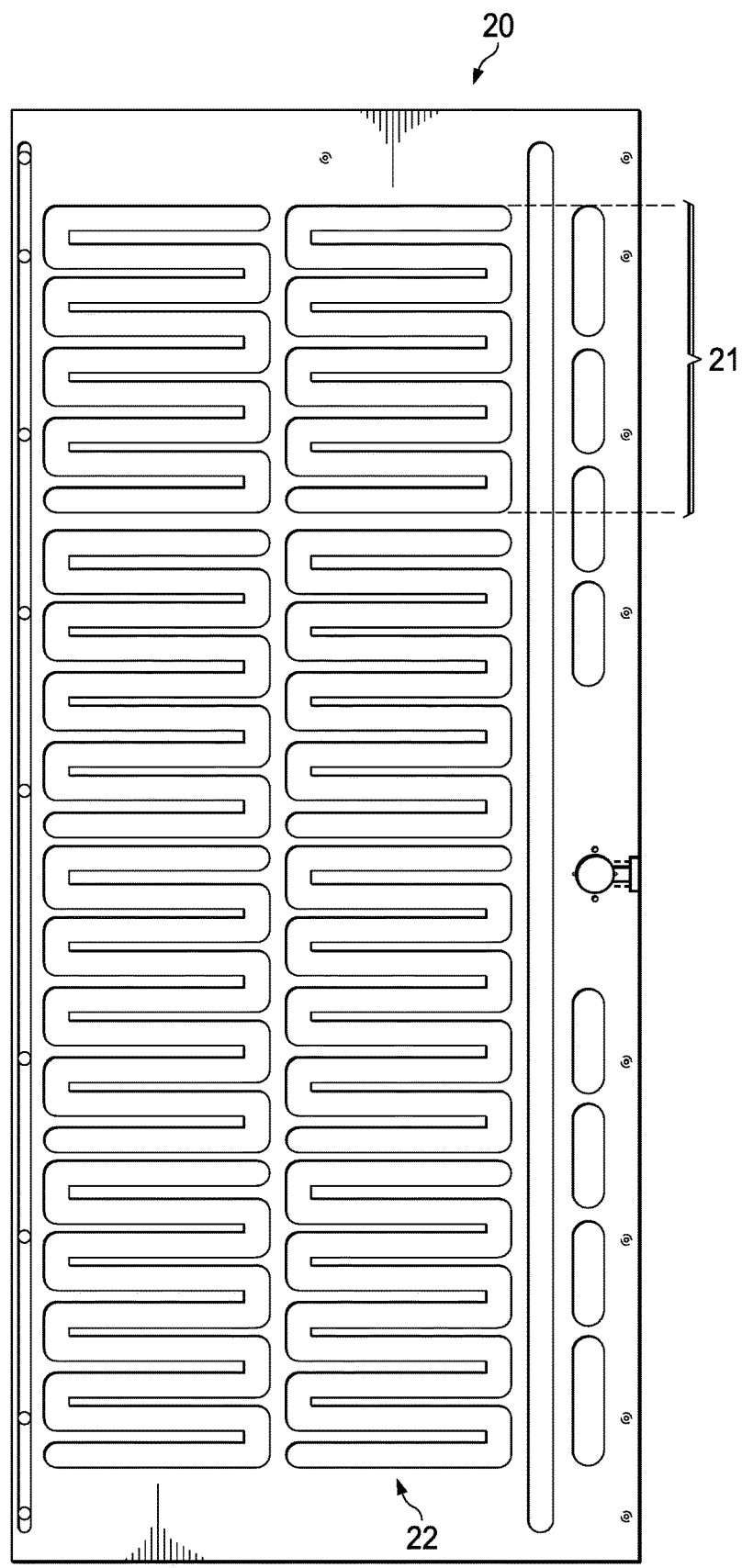
FIG. 2 is a front perspective of an exterior panel.

FIG. 2 shows a front perspective of an exterior door panel 20 and an embodiment of a horizontal pattern 22. The horizontal pattern 22 is made up of horizontal cut-outs 21. In one embodiment, interior panel 10 and exterior door panel 20 are cut so that the horizontal pattern 12 on the interior panel 10 mirrors the horizontal pattern 22 on exterior door panel 20.

Figure 3:
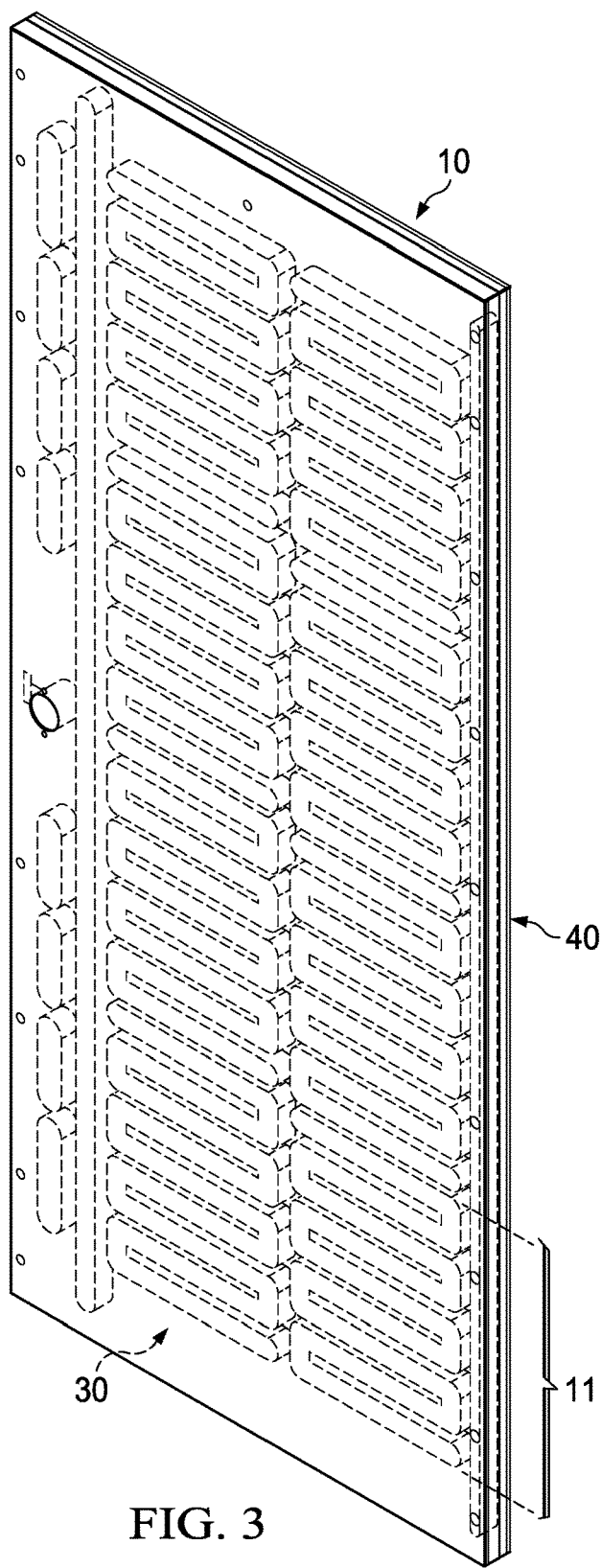
FIG. 3 is a perspective cut-away view of the interior panel.

FIG. 3 shows a perspective cut-away view of the interior panel 10. The horizontal cut-out 11 does not go through the entire interior side panel 10. Rather horizontal cut-out 11 goes through inner face 30 but does not reach the outer face 40.

Figure 4:
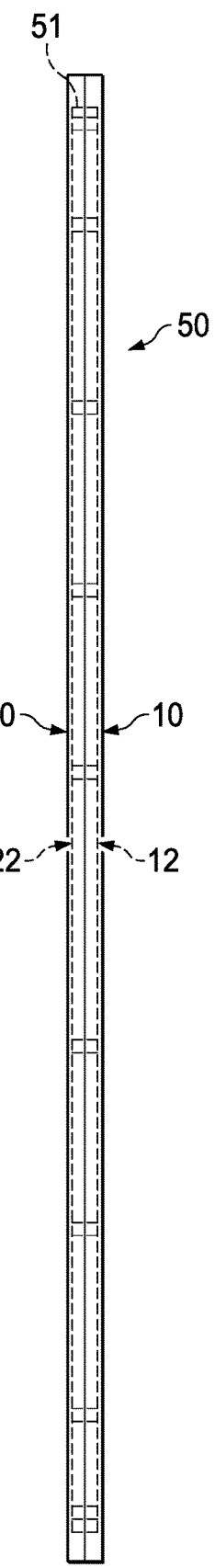
FIG. 4 is a cross sectional view of the sides of the joined interior and exterior panels.

FIG. 4 shows a side view of one possible configuration of a partially manufactured man-door 50 comprised of interior panel 10 and exterior door panel 20. The interior panel 10 and exterior door panel 20 are attached so that the horizontal pattern 12 of the interior panel 10 lines up with the horizontal pattern 22 of the exterior door panel 20. In one embodiment, the interior panel 10 is attached to the exterior door panel 20 with through bolts 51 along the perimeter of the door. This configuration increases rigidity.

Figure 5:
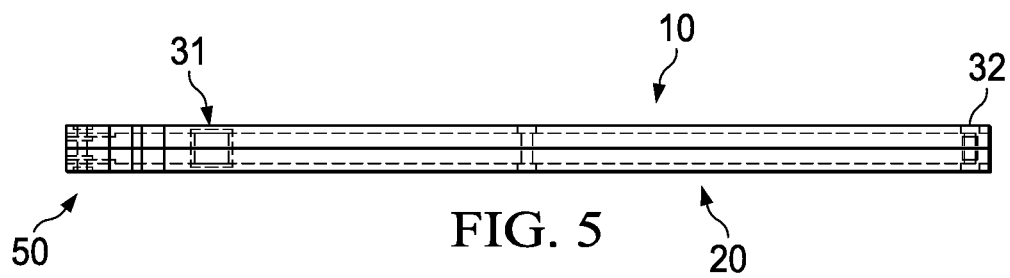
FIG. 5 is a cross-sectional view of the top of the joined interior and exterior panels.

FIG. 5 shows a top view of one possible configuration of a partially manufactured man-door 50 comprised of interior panel 10 and exterior door panel 20. In an embodiment, two pultruded fiberglass stiffeners, 31 and 32, may be added to the finished door to increase beam strength to the height of the panel. In certain embodiments, the pultruded fiberglass stiffener 31 is 1½"×1½" and pultruded fiberglass stiffener 32 is ⅝"×1". The pultruded fiberglass stiffener 32 on the continuous hinge side will decrease the stresses on the through bolts to eliminate plastic deformation of the polyethylene plastic. The pultruded fiberglass stiffeners can be recycled separately from the polyethylene. For example, they may be ground down and used as a filler for concrete.

Figure 6:
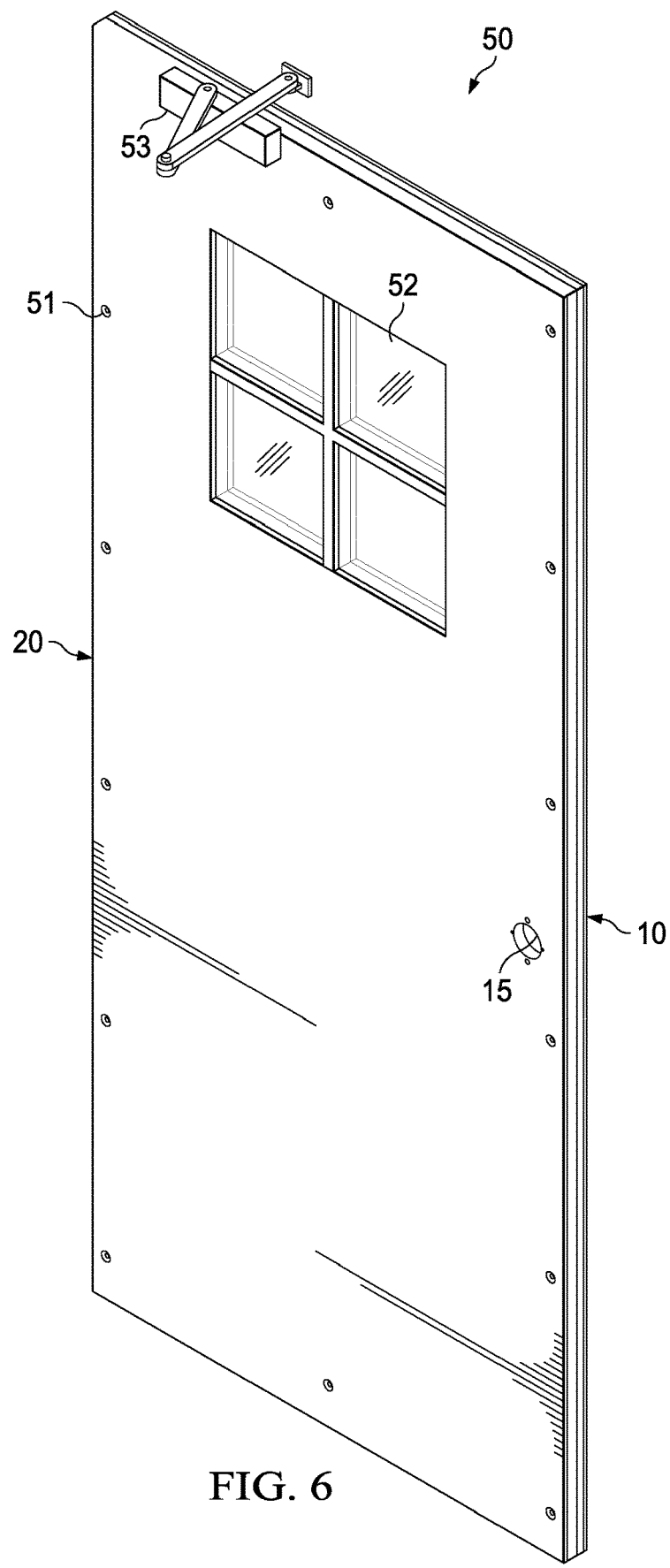
FIG. 6 is a completed man-door with hardware attached.

FIG. 6 depicts an embodiment of man-door 50 where through bolts 51 are evenly spaced around the perimeter of both the interior panel 10 and exterior door panel 20. Other embodiments could use different numbers of configurations of through bolts 51. In another embodiment, there is a doorknob hole 15.

FIG. 6 also depicts man-door 50 with certain elements of hardware and finishing that have been added during manufacturing, including a window 52 and a closer 53.

In summary, the improved polyethylene plastic man-door allows for a polyethylene plastic sheet with increased thermal range, durability, temperature sensitivity and strength, and a reduction in weight. An additional benefit of the improved polyethylene plastic man-door is that it is 100% recyclable. Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A method of manufacturing a polyethylene plastic door comprising:

heating a first plurality of polyethylene plastic pellets and polymer additives;

extruding a heated mixture of polyethylene plastic pellets and polymer additives to form a first plastic sheet comprising first and second substantially planar surfaces and a second plastic sheet comprising third and fourth substantially planar surfaces;

removing from the first substantially planar surface of the first plastic sheet a first plurality of cut-outs;

removing from the third substantially planar surface of the second plastic sheet a second plurality of cut-outs, wherein the second plurality of cut-outs mirrors the first plurality of cut-outs;

forming a door by attaching the first substantially planar surface of the first plastic the cavity formed by the first plurality of cut-outs and the second plurality of cut-outs form a cavity which is within an interior of the door and the second substantially planar surface of the first plastic sheet and the fourth substantially planar surface of the second plastic sheet form an exterior surface of the door; and recycling a material removed from at least one of the first plurality of cut-outs and the second plurality of cut-outs.

2. The method of claim 1, wherein the step of forming the first plurality of cut-outs is performed using tool paths created by a CNC machine.

3. The method of claim 1, wherein the polymer additives comprise calcium carbonate.

4. The method of claim 3, wherein a resulting composition of calcium carbonate is 15%.

5. The method of claim 1, wherein the step of attaching the first plastic sheet to the second plastic sheet is performed using through bolts.

6. The method of claim 1, wherein a wall-thickness of the first plastic sheet at a respective cut-out is no more than 0.23" thick.

7. The method of claim 1, wherein a wall-thickness of the second plastic sheet at a respective cut-out is no more than 0.23" thick.

* * * * *